(12) United States Patent
Acker et al.

(10) Patent No.: US 6,704,805 B1
(45) Date of Patent: Mar. 9, 2004

(54) EJB ADAPTION OF MQ INTEGRATION IN COMPONETBROKER

(75) Inventors: Liane Elizabeth Haynes Acker, Orange Park, FL (US); Ping Chen, Austin, TX (US); James Irwin Knutson, Austin, TX (US); Zhong-Yu Zhou, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/549,152

(22) Filed: Apr. 13, 2000

(51) Int. Cl.[7] .............................. G06F 9/44; G06F 9/00
(52) U.S. Cl. ..................... 709/315; 709/314; 709/316
(58) Field of Search ................... 709/310–332

(56) References Cited

U.S. PATENT DOCUMENTS

| | | | |
|---|---|---|---|
| 5,911,071 A | | 6/1999 | Jordan ........................ 395/701 |
| 6,282,580 B1 | * | 8/2001 | Chang ........................ 709/316 |
| 6,347,342 B1 | * | 2/2002 | Marcos et al. ............. 709/315 |
| 6,438,617 B1 | * | 8/2002 | Savitzky et al. ............ 709/316 |
| 6,438,744 B2 | * | 8/2002 | Toutonghi et al. .......... 717/137 |
| 6,453,356 B1 | * | 9/2002 | Sheard et al. ............... 709/231 |
| 6,510,550 B1 | * | 1/2003 | Hightower et al. ......... 717/108 |
| 6,522,343 B2 | * | 2/2003 | Sobeski et al. ............. 345/744 |

OTHER PUBLICATIONS

OMG. Digal Equipment Corporation. "COM/CORBA Interworking" Aug. 22, 1995.*
Sun Microsystems. "Enterprise JavaBeans to CORBA Mapping." Aug. 11, 1999.*
Chappell, David. "Understanding ActiveX and OLE" 1996, p. 24–26, 301–304.*
Platt, David S. "Understanding COM+". Chapter 4: Queued Components. Jun. 1999.*
Thomas, Anne. "Selecting Enterprise JavaBeans Technology". WebLogic, Inc. Jul. 1998.*
Sun Microsystems. "JavaBeans". Jul. 24, 1997.*

* cited by examiner

*Primary Examiner*—John Follansbee
*Assistant Examiner*—Lewis A. Bullock, Jr.
(74) *Attorney, Agent, or Firm*—David A. Mims, Jr.; Bracewell & Patterson, L.L.P.

(57) ABSTRACT

A system, method, and program product, in which a stateful EJB session bean is used as the front end to client calls. In this configuration, a queue is represented by a session bean instance. "Put" and "get" are called on the relevant session bean instances. Thus, for example, a client, instead of first finding a home for a given type of OMs then calling "put" on the home to send out messages, will find a session bean home, create a session bean instance corresponding to a queue, and call "put" on the bean instance to send messages. In this manner, the message queue can be managed using standard EJB techniques.

36 Claims, 4 Drawing Sheets

EJB ADAPTION OF MQ INTEGRATION IN COMPONETBROKER

BACKGROUND OF THE INVENTION

1. Technical Field

The present invention generally relates to distributed data processing systems and in particular to server programming in distributed data processing systems. Still more particularly, the present invention relates to improved techniques for treating messaging tasks as programming objects in distributed data processing systems.

2. Description of the Related Art

Java™ (a trademark of Sun Microsystems, Inc. of San Jose, Calif.) is a software development language that enables programmers to create program applications and small programs called applets. A virtual machine is generated by Java™ that provides a control interface allowing a Java™ program to overlay and operate on virtually any operating system.

Java™ (Java) was developed with distributed computing, low to no administration and platform independence in mind. The Java™ platform for enterprise-capable Java™ computing utilizes Enterprise JavaBeans™ (trademark of Sun Microsystems) (EJBean) technology that provides for the development and deployment of reusable server components. EJBean server components are individual specialized applications that run in an application server. Traditionally, in a client/server application, the client contains control logic for manipulating a database management system on the server.

EJBeans are designed to support high scalability using a multitier distributed application architecture (architecture that has multiple application components) and the multitier orientation provides many advantages over traditional client/server architectures. EJBean components contain no system level programming, include only business related logic and are fully portable across any EJBean compliant server and any Operating System (OS). Some advantages to EJBean components include reusability, performance, scalability, wire protocol neutral architecture and manageability among others.

Locating logic, for manipulating data, on one or more servers allows an application to operate in multi-processing and multi-threaded systems. Server components can be replicated and distributed across multiple systems enabling multi-tier systems with a scalability of essentially no limit. With a multi-tier environment, reliability is high and manageability is easier because most of the application logic is on the server.

A server component is a reusable software application that performs specific functions and is accessible to any other application through the server component's interface. A server component can be developed for one application and reused in another application that may use the function. Basically, server components are basic building blocks that have specific, published functions that may be combined with other components and applications into a configuration that performs a task designed by a developer.

Traditionally, a Java Virtual Machine (JVM) allows a Java application to run on any operating system, but server side components require proprietary programming interfaces based on vendor software and hardware. EJBean server components are portable and virtually vendor-independent on all Java EJBean compliant application servers. With server component portability, increased scalability, reliability and re-usability, EJBean components can be moved from one execution environment to another without requiring any recoding. Determining whether a new component is valid is a problem that accompanies portability and reusability of EJBean components. EJBean components are required to implement a specific set of interfaces with the container that encloses the beans so the container can manage and control the bean. If the component has a purported function and is moved from one execution environment to another, the component should be validated before being deployed throughout the system served by the EJBean compliant server.

Deploying an EJB involves introspecting classes, reading serialized deployment data, generating code, compiling the generated code and packaging it all up for installation. This can take a significant amount of time to complete, particularly if the platform uses C++ as part of the generated code. The largest portion of time is spent compiling the generated code and can take hours to complete depending on the speed of the host, the amount of code being generated, and the language being used.

Component Broker, an International Business Machines Corporation (IBM) product, is a business tool, which integrates the open standards contained in the Object Management Group's Common Object Request Broker Architecture (CORBA) initiative. Component Broker (CB) provides server-based support for customers to build, execute, and manage applications across network computing environments. Component Broker technology includes: a programming model that enables data access to be partitioned from business logic; a CORBA 2.0 compliant ORB, using the widely accepted Internet Interoperability Protocol (IIOP) standard to communicate with other complying ORB's; an application runtime environment, providing integration and management of object services; management of distributed applications interactions with networked computing hardware/software resources (for monitoring, resource allocation, unit of work); support for Web (Java) clients, traditional CORBA clients, ActiveX clients, and an ever-increasing number of nontraditional clients, including kiosks, ATM's, and so on; and multi-tier visual development tools for the major Object Oriented Programming languages.

IBM's Component Broker Connector provides support for the EJB specification; Component Broker is an EJB server environment. It provides the qualities of service prescribed by the EJB specification and allows developers to build enterprise application business objects using the EJB programming model. Further details of the MQSeries Application Adaptor and its integration with Component Broker may be found in "MQSeries Application Adaptor Concepts and Development Guide Version 3.0, " available from the International Business Machines Corporation and hereby incorporated by reference.

It would be desirable to provide EJB support for message queue (MQ) integration, to provide Component Broker customers with an EJB programming interface on the client side that allows them to treat the MQ objects as EJBs just as they do other business objects in the CB environment. In present systems, this has proven difficult for several reasons.

First, the base interfaces for both inbound and outbound message homes of Component Broker inherit from CosLifeCycle::GenericFactory rather than from IHome, the typical base interface for CB homes. This is purposefully done to remove the "createFrom" and "findBy" methods from the programming interface. Every Component Broker managed object class has an instance of a Factory associated with it, which provides a set of interfaces for creating instances of a managed object. The Factory gets some of its interface from the base class CosLifeCycle::GenericFactory.

The createFromPrimaryKeyString method is introduced in the IManagedClient::IHome interface supplied by Component Broker. This interface specializes the CosLifeCycle::GenericFactory interface and plays the role of factory for Component Broker managed objects. Object providers can implement and provide a tailored subclass of this interface, or can use the implementation of IHome provided. Homes are at well-known locations in the Naming Service. The input required for the factory finder is the name of the interface of the class that you want this factory to make instances of. This, and other details of Component Broker programming may be found in the Component Broker "Programming GuideVersion 3.0, " available from the International Business Machines Corporation and hereby incorporated by reference.

Next, the "put" method on OMQueue does not return an OM reference, as a "create" method would normally do. This is reasonable, since there is nothing that the client can do with an OM once it is put to the queue. However, this is a further deviation from the "create from home" approach currently required by Component Broker.

Third, the message key interfaces are developed primarily to be conformant to CB programming model. In fact, OutboundMessageKey is never used at all and InboundMessageKey's use is completely hidden from the client.

Further, the "get" method's returning an incoming message (IM) instance seems to be a reflection of missing object-by-value support, since there is not much to be done with the returned IM instances, except to retrieve message fields from them. This can be done just as well with MessageTemplates if Object By Value (OBV) were available.

Therefore, it would be desirable to provide a system and method for EJB support for message queue (MQ) integration, so that programmers of systems such as Component Broker can treat the MQ objects as Enterprise JavaBeans, as with other business objects.

SUMMARY OF THE INVENTION

It is therefore one object of the present invention to provide an improved distributed data processing system.

It is another object of the present invention to provide improved server programming in distributed data processing systems.

It is yet another object of the present invention to provide improved techniques for treating messaging tasks as programming objects in distributed data processing systems.

The foregoing objects are achieved as is now described.

According to the preferred embodiment, a stateful EJB session bean is used as the front end to client calls. In this configuration, a queue is represented by a session bean instance. "Put" and "get" are called on the relevant session bean instances. Thus, for example, a client, instead of first finding a home for a given type of OMs then calling "put" on the home to send out messages, will find a session bean home, create a session bean instance corresponding to a queue, and call "put" on the bean instance to send messages. In this manner, the message queue can be managed using standard EJB techniques.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
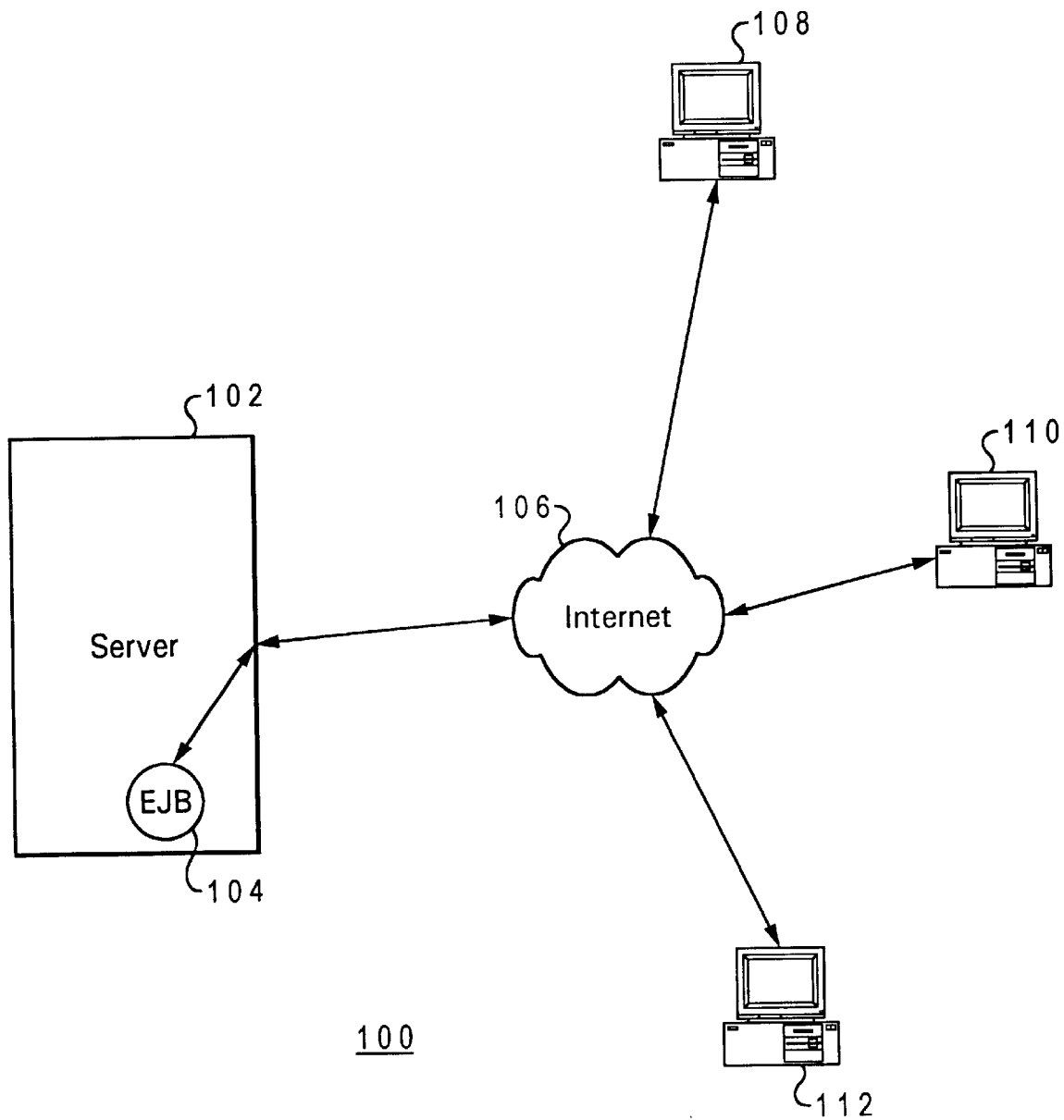
FIG. 1A depicts a distributed computing system in accordance with a preferred embodiment of the present invention.

With reference now to the figures, and in particular with reference to FIG. 1, a distributed computing system in accordance with a preferred embodiment of the present invention, is depicted. System 100 includes server 102, Enterprise Java Bean 104 (EJBean), Internet 106 and separate installations 108 through 112. On server 102, multiple EJBean 104 components may exist at any one time, providing various business related functions. Server 102 must be Enterprise Java Bean compliant and must supply a standard set of services to support EJBean 104 components. Additionally, server 102 must provide a container for the EJBean 104 component which implements control and management for classes of the EJBean 104. Since EJBean 104 components do not require a specific container system, virtually any application server can be adapted to support EJBean 104 components, by adding support for the service defined in the EJB specification.

In the present invention, Internet 106 provides the connection between systems 108–112. Systems 108–112 represent Local Area Networks (LAN), standalone computers, Wide Area Networks (WAN), and any other data processing system that may connect with server 102 through Internet 106. Multiple systems may connect at the same time with EJBean 104, via home and remote interfaces, utilizing Internet 106 browser clients. Each Enterprise Java Bean is stored in a logical container (see FIG. 1B) and any number of EJBean 104 classes can be present in a single container. A container may not necessarily be present in a single server location, and the EJB container could be replicated and distributed across many systems. EJBean 104 may be transient or persistent. A transient bean is termed a "session" bean and a persistent bean is termed an "entity" bean. Session beans are temporary and usually exist only for a single client/server session.

Figure 1B:
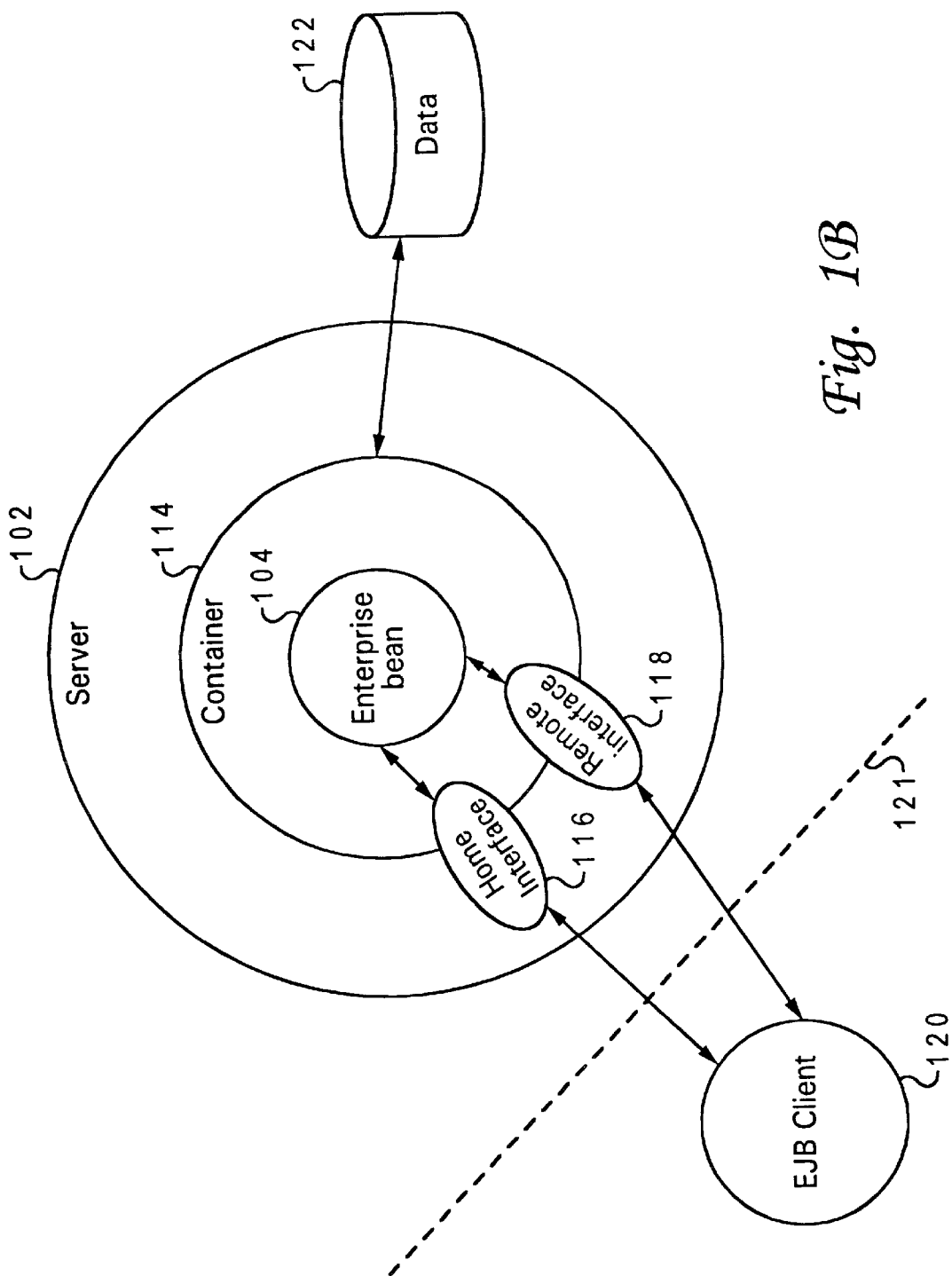
FIG. 1B is a high-level block diagram of operation of an Enterprise Java bean in accordance with the present invention.

Referring to FIG. 1B, a high-level block diagram of operation of an Enterprise Java bean in accordance with the present invention, is illustrated. Client 120 is a Java compliant program originating on a data processing system that is typically remote from the server. Container 114 is the interface between client 120 and EJBean 104. When EJBean 104 is to be deployed (accessed by client 120), container 114 automatically produces home interface 116 and remote interface 118. Remote interface 118 provides access, by client 120, to business methods within EJBean 104. Home interface 116 identifies EJBean 104 class and is utilized to create, find and remove EJBean 104 instances. Essentially, container 114 acts as a filter and provides rules concerning transactions, state, security, etc., on all operations. Additionally, container 114 provides an interface with data sources 122, external to the container, that EJBean 104 utilizes during transactions.

To provide a system and method for EJB support for message queue (MQ) integration, the EJB object most closely corresponding to the MQ objects must be used. The closest match in EJB to an OutboundMessage (OM) or InboundMessage (IM) depicted in last section would be an entity bean with container managed persistence. Container managed persistence is important because it would allow transaction demarcation to be automatically managed by CB's BOIM mechanism.

The EJB specification is more stringent on the home concept than is Component Broker in general, and methods other than create, find, and remove are not allowed on an EJB home.

Therefore, according to the preferred embodiment, a stateful session bean is used as the front end to client calls. In this configuration, a queue is represented by a session bean instance. "Put" and "get" are called on the relevant session bean instances. Thus, for example, a client, instead of first finding a home for a given type of OMs then calling put on the home to send out messages, will find a session bean home, create a session bean instance corresponding to a queue, and call put on the bean instance to send messages. Exemplary Java code for implementing the preferred embodiment is below.

By wrapping a ComponentBroker business object with an EJB, the preferred embodiment doesn't create anything new in the MQ space proper. This allows application programming with an EJB view to the MQAA and allows more choice for the user. By providing an EJB approach, users are able to manage CB message objects using industry standard programming techniques.

As part of the CB 3.0 MQSeries Application Adapter (MQAA) effort, BOIM and OTS in CB will be extended to accommodate the XA resource management interface supported by MQ. BOR refers to the Business Object Instance Manager, which is a framework that serves as the foundation for all CB application adaptors, such as the MQAA. XA is an international standard specification for distributed transactions. OTS is CB's CORBA-compliant transaction service. CB OTS has several extensions to deal with various transactional resources, such as DB2, Oracle, and MQ, which are all XA-compliant in a certain sense. These extensions allow OTS to work with CB's numerous application adaptors, such as DB2AA, Oracle AA, and MQAA, to manage distributed transactions appropriately.

This benefit can only be had if a persistent CB business object (BO) or an entity bean with container managed persistence is used to interface the MQ backend. Therefore the afore-mentioned session bean only serves as a front-end that is backed up by either an entity bean deployed in a CB container or a persistent CB BO. In both cases, the CB container is configured per MQAA requirement.

Furthermore, since this persistent object is not exposed to the EJB client in any way, it really doesn't matter whether it is an entity bean or a conventional CB BO as far as the client programming model is concerned. It is therefore preferable to use the latter since it is simpler to implement and more efficient.

Note that in this scheme the session bean represents either an outbound or an inbound message queue rather than a specific type of outbound or inbound message instances. Message instances are represented by the backing BO instances.

MQSeries provides a mechanism for assured delivery of messages, which can be sent even when the target is disconnected. It can be used to distribute work around a large number of disparate systems in an environment where trying to propagate transactional two-phase commit is not practical. The MQSeries application adaptor provided by Component Broker is used primarily to provide a semi-transparent integration between Component Broker business applications and non-Component Broker applications that are based directly on MQSeries.

Client Application

A client application provides the presentation layer for the application. It calls the Component Broker business objects to obtain and manipulate data.

Application

A customer-specified implementation of business objects and underlying business logic.

Application Server

A Component Broker application server manages applications by instancing the managed objects for applications and providing the services needed to manage access to data and other resources.

Container

Represents and defines the characteristics of a specific queue manager. A queue manager is treated as just another persistent data store (although with some different characteristics from a relational database) in which data can be stored recoverably and retrieved within the scope of one or more transactions Homes The homes within the container represent the various message formats available for use with a specific queue managed by the queue manager.

OutboundMessage (OM) Objects

Managed objects (within an OM home) that represent specific message instances on an outbound queue.

InboundMessage (IM) Objects

Managed objects (within an IM home) that represent specific message instances on an inbound queue.

RDB Connection

Used to represent the characteristics of communication with a specific queue manager; for example, the queue manager's name and security policy. From a client perspective, an MQSeries-backed application looks like any other Component Broker-based client application that uses Component Broker transaction services.

It should be noted that the MQSeries application adaptor currently only supports a transactions container policy; to throw an exception and abandon the call when used outside the scope of a transaction. (Atomic transaction method calls are not supported.) The managed objects representing messages behave like any other managed object that uses the transaction services. Because such an object represents a message in a queue manager, its life cycle is controlled by the standard messaging data access operations, insert, retrieve, update, and delete (IRUD).

Component Broker, and its MQSeries application adaptor framework, drive these OM and IM object instances and call the IRUD methods at appropriate times. For example, if a client application is trying to get an inbound message that is not currently instanced in the application server, it creates a new IM object and issues the retrieve method on it to get the message from its queue. If the client commits the transaction, the message is removed from its queue.

Components

In Component Broker, a component consists of a distributed set of objects that client applications access as a single entity. To a client application, a component appears to be a single class, with methods and attributes and relationships like any other class. Behind this single interface, however, each component consists of multiple objects on both the client and the server. This separation provides flexibility and control in the way data is stored and accessed, and in the way that business processes are distributed. The objects can exist on any number of different servers and databases, but to the client they present a single interface, with a single set of attributes. Typically, a component consists of the following objects in Object Builder:

business object interface business object implementation data object interface data object implementation persistent object and schema key copy helper managed object Component Assembly When you assemble a component, you can start from the business object, data object, or schema. FIG. 16 on page 20 shows the relationships among component objects as you assemble them. When you configure the objects into a unified component, you select a subset of these objects to form a particular component on the server. The deployed component is accessed through its managed object, by client applications or other components that require access to the server data.

Component Execution

Figure 2:
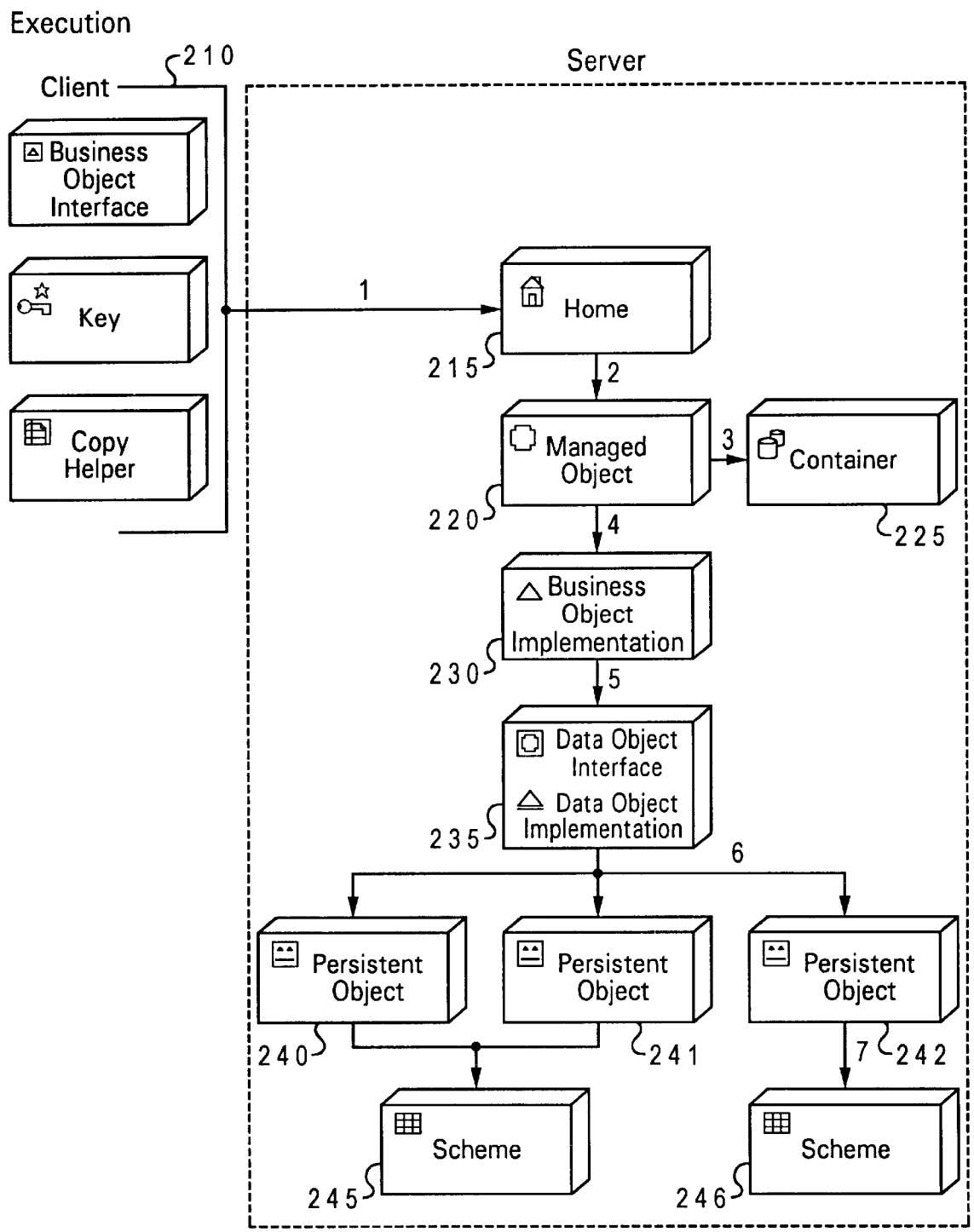
FIG. 2 is a block diagram of client-side and server-side messaging components in accordance with the present invention.

As depicted in FIG. 2, at execution time, a call to the component on the server resolves in the following order:

1. The client 210 calls the home 215 to find or create the component assembly.
2. The managed object 220 accepts the call (from the client 215 or from another component).
3. The managed object 220 calls its associated container 225 for Object Services before passing the call on to the business object 230.
4. The business object 230 accepts the call, and either returns the value of the attribute based on a cached copy of the data, or delegates the call to the data object 235.
5. The data object 235 accepts the call, and either returns the value of the attribute based on a cached copy of the data, or delegates the call to the persistent object 240/241/242.
6. The persistent object 240/241/242 accepts the call, and returns the value of the attribute based on a cached copy of the data if it exists.
7. The persistent object 240/241/242 retrieves the value from a database using the schema 245/246, and returns it.
8. The value is returned up the component tree until it reaches the managed object 220, which calls the container 225 again for Object Services before returning the value to the caller.

State Data

Every object has a state and a behavior, and presents an interface. An object's behavior is manifested in the implementation of the methods on the object's private and public interfaces. An object's state is manifested in its public and private data members and can be divided into two categories: essential and nonessential. The essential state makes up the state data of an object and consists of data that is persistent and not calculated or derived from other data members. The nonessential state consists of transient data that can be recreated as required. The nonessential state is usually derived from other state data and complements the essential state.

Objects

This section discusses objects used in Component Broker Programming.

Application Object

Application objects are business objects which are directing workflow and implementing some client initiated task. Methods often have an action verb associated with them which resembles the name of the use-case or end user transaction being performed. Application objects that are very process oriented are often stateless. They perform a particular task, calling other basic or composed business objects along the way, and then returning an indication of success or failure to the client application.

In Component Broker, an application object functions as part of an application component, which implements business logic and usage of other components, in the way that some application programs do today.

Business Objects

A business object represents a business function. Business objects contain attributes that define the state of the object, and methods that define the behavior of the object. A business object also has relationships with other business objects. It can cooperate with other business objects to perform a specific task. Business objects are independent of any individual application. They can be used in any combination to perform a desired task. Typical examples of business objects are: Customer, Invoice, or Account.

In Component Broker, a business object functions as part of a component, which is a collection of related objects that work together to represent the logic and data relationships of the business function. A business object's interface is defined in an IDL file. Its implementation can be in either C++ or Java.

Composed Business Object

A composed business object represents a facade or an abstraction that encapsulates basic business objects and other composed business objects. Encapsulation means that the client of the composed business object is not generally aware of the various pieces that make up the composition. The data members of the composed business object implementation are usually references to other business objects. If these references can be calculated based on some key data, then the composition might not have any specific backing store information. If the composition is assembled at the object level and there is no way to calculate composition's components from the composition's key, then the object references which make up the composition must be stored persistently. Database tables for composite business objects are generally new tables and persistently capture these new relationships.

In Component Broker, a composed business object functions as part of a composite component, which is a collection of related business objects that work together to represent the logic and data relationships of the business function. Compositions often have patterned method implementations. Each method exposed to the client might involve one or more calls to private methods, touching each of the basic business objects that are contributing to the composition.

Data Object

A data object is responsible for managing the persistence of a component's essential state information (state data). It provides an interface for getting and setting the state data. A data object isolates its business object from having to:

1. Know which of many datastores to use to make its state persistent.
2. Know how to access the datastore.
3. Manage access to the datastore.

A data object has two parts: the data object interface, which defines the state data of the component, and the data object implementation, which defines the form of persistence and access patterns for the data.

Figure 3:
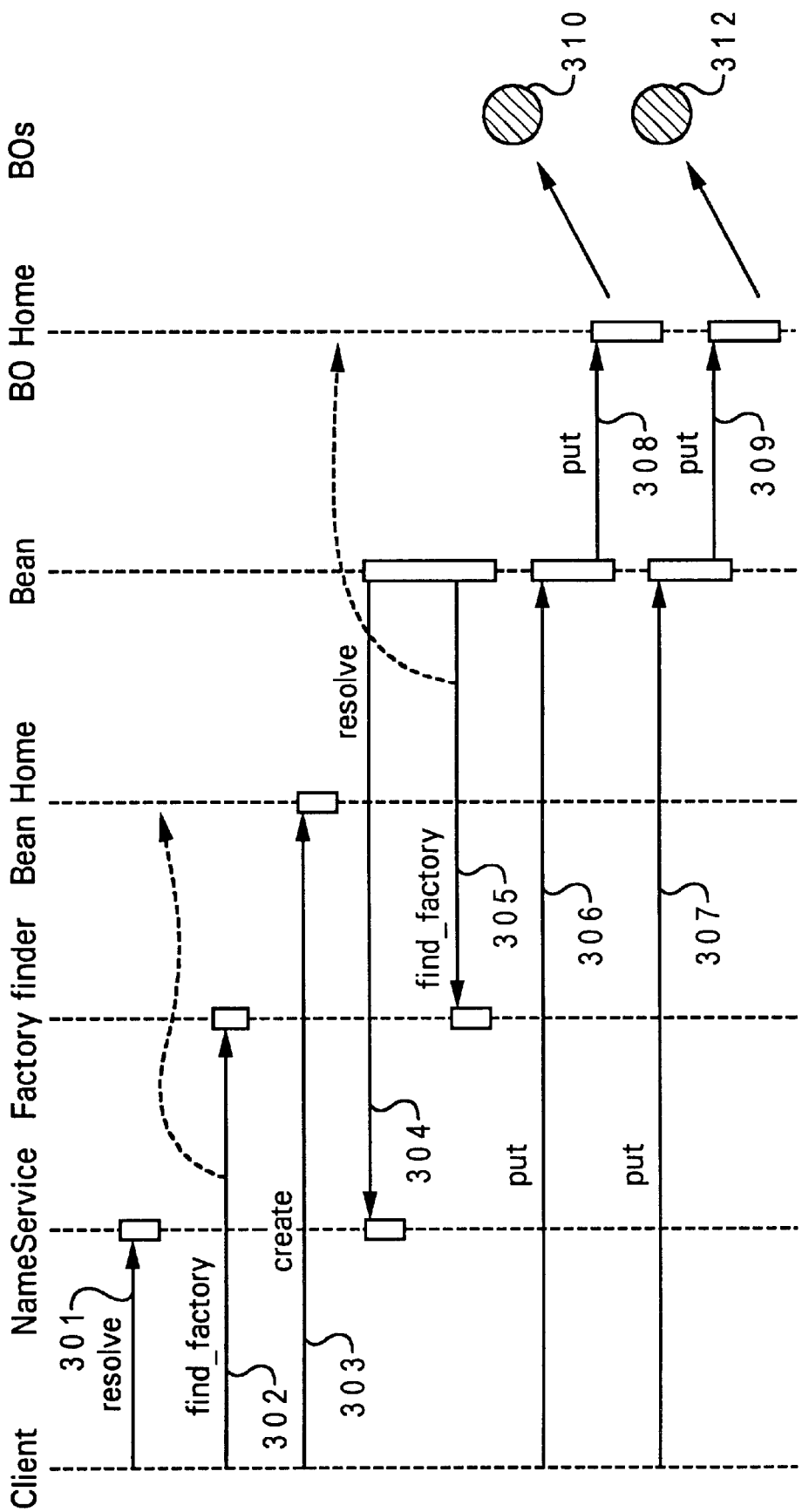
FIG. 3 is a message-flow diagram in accordance with the present invention.

FIG. 3 shows a high-level view of the interactions between objects involved in the MQAA-EJB support of the preferred embodiment. The client initiates the scenario by calling resolve on the NameService, call 301, which results in a factory finder being returned to the client. The client then calls find_factory on the factory finder, call 302, to locate the specific home (or factory) for the given bean, which is the "wrapper" session bean described in the preferred embodiment, and can then call the bean home directly, call 303.

Next, the session bean calls NameService, call 304, and calls factory finder, call 305, to locate the home for the backing MQ Business Object that deals directly with the MQ queue. Once this home is found, the bean saves the home as part of its state. Then every time the client calls put on the bean, call 306,307, passing in a message, the bean will relay the message to the backing BO home by calling put on the latter, call 308,309. Each put call on the BO home creates a new BO 310,312, which in the MQAA case, creates a new message on the MQ queue.

Following is exemplary Java code for implementing a preferred embodiment of the present invention. Of course, those of skill in the art will recognize that this is merely one example of many possible programming implementations, and will understand that other implementations which accomplish the innovative functions described herein are expected to fall within the scope of the claimed invention.

```
// File TMMsgTemplate.java
package mytest.ejb.mqaa;
public class TMMsg Template implements java.ioSerializable
{
    // Framework-introduced field
    public java.lang.String correlator;
    // User defined fields
    public java.lang.String textMsg;
    public java.lang.String replyToQ;
    public java.lang.String replyToQMgr;
    public java.lang.String getCorrelator( )
    {
        return correlator;
    }
    public void setCorrelator(java.lang.String correlatorIn)
    {
        correlator = correlatorIn;
    }
    public java.lang.String getTextMsg( )
    {
        return textMsg;
    }
    public void setTextMsg(java.lang.String textMsgIn)
    {
        textMsg = textMsgIn;
    }
    public java.lang.String getReplyToQ( )
    {
        return replyToQ;
    }
    public void setReplyToQ(java.lang.String replyToQIn)
    {
        replyToQ = replyToQIn;
    }
    public java.lang.String getReplyToQMgr( )
    {
        return replyToQMgr;
    }
    public void setReplyToQMgr(java.lang.String replyToQMgrIn)
    {
        replyToQMgr = replyToQMgrIn;
    }
}
// File TMOutboundEJBObject.java
package mytest.ejb.mqaa;
import javax.ejb.EJBObject;
import mytest.ejb.mqaa.TMMsgTemplate;
public interface TMOutboundEJBObject extends EJBObject
{
    public java.lang.String put(TMMsgTemplate omTempl) throws
            java.rmi.RemoteException,
            com.ibm.lMessageHome.lMessagePutFailed,
            com.ibm.lManagedClient.lInvalidKey,
            com.ibm.lManagedClient.lInvalidCopy;
}
// File TMOutboundBean.java
package mytest.ejb.mqaa;
import java.lang.*;
import javax.ejb.SessionBean;
import javax.ejb.SessionContext;
import com.ibm.CBCUtil.CBSenesGlobal;
import org.omg.CORBA.ORB;
import com.ibm.lExtendedNaming.*;
import com.ibm.lExtendedLifeCycle.*;
import com.ibm.lMessageHome.*;
import com.ibm.ejb.cb.runtime.MQAARuntimeUtil;
public class TMOutboundBean implements SessionBean
{
    private OutboundMessageQueue omQueue;
    private Object reusableCopy;
    private Class copyClass;
    public void ejbCreate( ) throws
            java.rmi.RemoteException, javax.ejb.CreateException
    {
        org.omg.CORBA.Object obj;
        FactoryFinder factoryFinder;
        try
        {
            CBSeriesGlobal.Initialize( );
            obj = CBSeriesGlobal.nameService( ).resolve_with_string
                ("host/resources/factory-finders/host-scope");
            factoryFinder = FactoryFinderHelper.narrow(obj);
        }
        catch (Exception e)
        {
            throw new javax.ejb.CreateException("Failed at
            CBSeriesGlobal init or factory finding.");
        }
        try
        {
            obj = factoryFinder.find_factory_from_string
                ("TextMessage::TMOutbound.object interface");
            omQueue = OutboundMessageQueueHelper.narrow(obj);
        }
        catch (Exception e)
        {
            throw new javax.ejb.CreateException("Failed to
            find TMOutboundHome from factory finder");
        }
        try
        {
            copyClass = Class.forName("Text-
            MessageCopy.TMOutboundCopyHelper");
            java.lang.reflect.Method met = copy-
            Class.getMethod("_create", new Class[ ]{ });
            reusableCopy = met.invoke(null, new Object[ ] { });
        }
```

-continued

```
    catch (Exception e)
    {
        throw new javax.ejb.CreateException("Failed
        to create a TMOutboundCopy instance");
    }
}
public void ejbActivate( ) throws java.rmi.RemoteException
{
}
public void ejbPassivate( ) throws java.rmi.RemoteException
{
}
public void ejbRemove( ) throws java.rmi.RemoteException
{
}
public void setSessionContext(SessionContext ctx) throws
                    java.rmi.RemoteException
{
}
public String put(TMMsgTemplate omTemplEJB) throws
            java.rmi.RemoteException,
            com.ibm.lMessageHome.lMessagePutFailed,
            com.ibm.lManagedClient.lInvalidkey,
            com.ibm.lManagedClient.lInvalidCopy
{
    Object[ ] paramObj = new Object[1];
    Class[ ] paramCls = new Class[1];
    java.lang.reflect.Method method = null;
    byte[ ] templString = null;
    try
    {
        paramObj[0] = MQAARuntimeUtil.value-
        ToObj(omTemplEJB.getCorrelator( ));
if (paramObj[0] != null)
{
        paramCls[0] = paramObj[0] .getClass( );
        reusableCopy.getClass( ).getMethod("correlator",
        paramCls).invoke(reusableCopy, paramObj);
}
        paramObj[0] = MQAARuntimeUtil.value-
        ToObj(omTemplEJB.getTextMsg( ));
if (paramObj[0] != null)
{
        paramCls[0] = paramObj[0] .getClass( );
        method = reusableCopy.getClass( ).get-
        Method("textMsg", paramCls);
            method.invoke(reusableCopy, paramObj);
}
        paramObj[0] = MQAARuntimeUtil.value-
        ToObj(omTemplEJB.getReplyToQ( ));
if (paramObj[0] != null)
{
        paramCls[0] = paramObj[0] .getClass( );
        reusableCopy.getClass( ).getMethod("replyToQMgr",
        paramCls).invoke(reusableCopy, paramObj);
}
        paramObj[0] = MQAARuntimeUtil.value-
        ToObj(omTemplEJB.getReplyToQMgr( ));
if (paramObj[0] != null)
{
        paramCls[0] = paramObj[0].getClass( );
        reusableCopy.getClass( ).getMethod("replyToQMgr",
        paramCls).invoke(reusableCopy, paramObj);
}
        method = reusableCopy.getClass( ).get-
        Method("_toString", new Class[ ] { });
        templString = (byte[ ]) method.invoke(reusableCopy,
        new Object[ ] { });
    }
    catch (Exception e)
    {
        e.printStackTrace( );
        System.exit(1);
    }
        String correlatorOut = omQueue.put(templString);
        return correlatorOut;
    }
    // The following are for the EJB deployment tool's use only
    public final static String_PAA_
```

-continued

```
    TYPE_ "MQAA";
// public final static String _CB_BO_BASE-
NAME_ = "TMOutbound";
}
// File TMOutboundEJBHome.java
package mytest.ejb.mqaa;
import javax.ejb.EJBHome;
public interface TMOutboundEJBHome extends EJBHome
{
    public TMOutboundEJBObject create( ) throws
                        java.rmi.RemoteException,
                        javax.ejb.CreateException;
}
// File TMInboundEJBHome.java
package mytest.ejb.mqaa;
import javax.ejb.EJBHome;
public interface TMInboundEJBHome extends EJBHome
{
    public TMInboundEJBObject create( ) throws
                        java.rmi.RemoteException,
                        javax.ejb.CreateException;
}
// File TMInboundEJBObject.java
package mytest.ejb.mqaa;
import javax.ejb.EJBObject;
import mytest.ejb.mqaa.TMMsgTemplate;
public interface TMInboundEJBObject extends EJBObject
{
    public TMMsgTemplate getNext( ) throws
                        java.rmi.RemoteException,
                        com.ibm.lMessageHome.lMessage-
                        NotFound,
                        com.ibm.lManagedClient.lInvalidKey;
    public TMMsgTemplate get(java.lang.String correlator) throws
                        java.rmi.RemoteException,
                        comibm.lMessageHome.lMessageNotFound,
                        com.ibm.lManagedClient.lInvalidkey;
}
// File TMInboundBean.java
package mytestejb.mqaa;
import java.lang.*;
import javax.ejb.SessionBean;
import javax.ejb.SessionContext;
import com.ibm.CBCUtil.CBSeriesGlobal;
import org.omg.CORBA.ORB;
import com.ibm.lExtendedNaming.*;
import com.ibm.lExtendedLifeCycle.*;
import com.ibm.lMessageHome.*;
public class TMInboundBean implements SessionBean
{
    private InboundMessageQueue imQueue;
    public void ejbCreate( ) throws
                        java.rmi.RemoteException.javax.ejb-
                        CreateException
    {
org.omg.CORBA.Object obj;
FactoryFinder factoryFinder;
try
{
    CBSeriesGlobal.Initialize( );
    obj = CBSeriesGlobal.nameService( ).resolve_with_string
    ("host/resources/factory-finders/host-scope");
    factoryFinder = FactoryFinderHelper.narrow(obj);
}
catch (Exception e)
{
    throw new javax.ejb.CreateException("Failed at
    CBSeriesGlobal init or factory finding.");
}
try
{
    obj = factoryFinder.find_factory_from_string
    ("TextMessage::TMInbound.object interface");
    imQueue = InboundMessageQueueHelper.narrow(obj);
}
catch (Exception e)
{
    throw new javax.ejb.CreateException("Failed to find
    TMInboundHome from factory finder");
```

-continued

```
}
}
public void ejbActivate( ) throws java.rmi.RemoteException
{
}
public void ejbPassivate( ) throws java.rmi.RemoteException
{
}
public void ejbRemove( ) throws java.rmi.RemoteException
{
}
public void setSessionContext(SessionContext ctx) throws
java.rmi.RemoteException
{
}
  public TMMsgTemplate getNext( ) throws
                          javarmi.RemoteException,
                          com.ibm.lMessageHome.lMessage-
                          NotFound,
                          com.ibm.lManagedClientlInvalidKey
  {
    java.lang.Object inboundMsg = imQueue.getNext( );
    return msgTemplFromBO(inboundMsg);
  }
  public TMMsgTemplate getjava.lang.String correlator) throws
                          java.rmi.RemoteException,
                          com.ibm.lMessageHome.lMessage-
                          NotFound,
                          com.ibm.lManagedClient.lInvalidKey
  {
    java.lang.Object inboundMsg = imQueue.get(correlator);
    return msgTemplFromBO(inboundMsg);
  }
  private TMMsgTemplate msgTemplFromBO(javalang.Object bo)
  {
    TMMsgTemplate templ = new TMMsgTemplate( );
    java.langClass templCls = templ.getClass( );
    java.lang.reflect.Field templField = null;
    java.lang.Class boCls = bo.getClass( );
    java.lang.reflect.Method boMethod = null;
    try
    {
      templField = templCls.getField("correlator");
      templField.set(templ, boCls.getMethod("correlator",
      new Class[ ] { }).invoke(bo,
      new Object[ ] { }));
      templField = templCls.getField("textMsg");
      templField.set(templ, boCls.getMethod("textMsg",
      new Class[ ] { }).invoke(bo,
      new Object[ ] { }));
      templField = templCls.getField("replyToQ");
      templField.set(templ, boCls.getMethod("replyToQ",
      new Class[ ] { }).invoke(bo,
      new Object[ ] { }));
      templField = templCls.getField("replyToQMgr");
      templField.set(templ, boCls.getMethod("replyToQMgr",
      new Class[ ] { }).invoke(bo,
      new Object[ ] { }));
    }
    catch (Exception e)
    {
      eprintStackTrace( );
      System exit(1);
    }
    return templ;
  }
  // The following are for the EJB deployment tool's use only
  public final static String_PAA_TYPE_ = "MQAA";
  // public final static String_CB_BO_BASE-
  NAME_ = "TMInbound";
}
```

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for passing messages between program objects, comprising the steps of:
    calling, with a first programming object, a function to determine the properties of a first message object, the first message object being compliant with a first messaging protocol, wherein the first messaging object is an Enterprise Java Bean;
    calling, with the first message object, a function to determine the properties of a second message object, the second message object being compliant with a second messaging protocol;
    storing, in the first message object, a least a part of the properties of the second message object;
    passing a message to the first message object by the first programming object;
    calling the second message object by the first message object, wherein the message is passed from the first message object to the second message object; and
    passing the message from the second message object to a second programming object;
    wherein the message is communicated between objects employing diverse messaging protocols.

2. The method of claim 1, wherein the first messaging protocol is compliant with the Java programming language.

3. The method of claim 1, wherein the second messaging object is an message queue business object.

4. The method of claim 1, wherein the passing a message to the first message object comprises passing a put call on the Enterprise Java Bean.

5. The method of claim 4, wherein the message is a ComponentBroker message queue message.

6. The method of claim 1, and further comprising:
    managing said first message object with a container that contains said first message object.

7. The method of claim 6, said managing comprising managing persistence of said first message object to be coextensive with a communication session with said first programming object.

8. The method of claim 1, and further comprising instantiating said first message object in response to a factory call by said first programming object.

9. The method of claim 1, wherein said second message object is a factory, said method further comprising instantiating said second programming object by said factory in response to receipt by said factory of said message.

10. The method of claim 9, wherein said message is a first message, said method comprising:
    said factory instantiating another second programming object in response to receipt of a second message from said first programming object.

11. A method for passing messages between program objects, comprising the steps of:

calling, with a first programming object, a function to determine the properties of a first message object, the first message object being compliant with a first messaging protocol;

calling, with the first message object, a function to determine the properties of a second message object, the second message object being compliant with a second messaging protocol, wherein the second messaging protocol is compliant with the ComponentBroker MessageQueue;

storing, in the first message object, a least a part of the properties of the second message object;

passing a message to the first message object by the first programming object;

calling the second message object by the first message object, wherein the message is passed from the first message object to the second message object; and passing the message from the second message object to a second programming object;

wherein the message is communicated between objects employing diverse messaging protocols.

12. The method of claim 11, wherein the first messaging object is an Enterprise Java Bean.

13. A data processing system, comprising:

processing resources; and data storage coupled to said processing resources, said data storage including:

a first message object compliant with a first message protocol and a second message object compliant with a second message protocol, wherein the first messaging object is an Enterprise Java Bean, wherein said first message object, responsive to a call by a first program object, calls a function to determine properties of the second message object and stores within the first message object at least a part of the properties of the second message object, and wherein said first message object, responsive to thereafter receiving a message from the first programming object, calls the second message object to pass the message to the second message object, and wherein the second message object, responsive to receipt of the message, passes the message to the second programming object, such that the message communicated between programming objects employing diverse message protocols.

14. The system of claim 13, wherein the first messaging protocol is compliant with the Java programming language.

15. The system of claim 13, wherein the second messaging object is an message queue business object.

16. The system of claim 13, and further comprising:

a container that contains and manages said first message object.

17. The system of claim 16, wherein said container manages persistence of said first message object to be coextensive with a communication session with said first programming object.

18. The system of claim 13, and further comprising a factory that instantiates said first message object in response to a factory call by said first programming object.

19. The system of claim 13, wherein said second message object is a factory that instantiates said second programming object in response to receipt by said factory of said message.

20. The system of claim 19, wherein said message is a first message, and said factory instantiates another second programming object in response to receipt of a second message from said first programming object.

21. A data processing system, comprising:

processing resources; and data storage coupled to said processing resources, said data storage including:

a first message object compliant with a first message protocol and a second message object compliant with a second message protocol, wherein the second messaging protocol is compliant with the ComponentBroker MessageQueue, wherein said first message object, responsive to a call by a first program object, calls a function to determine properties of the second message object and stores within the first message object at least a part of the properties of the second message object, and wherein said first message object, responsive to thereafter receiving a message from the first programming object, calls the second message object to pass the message to the second message object, and wherein the second message object, responsive to receipt of the message, passes the message to the second programming object, such that the message communicated between programming objects employing diverse message protocols.

22. The system of claim 21, wherein the first messaging object is an Enterprise Java Bean instance.

23. The system of claim 22, wherein the first message object receives said a message via a put call.

24. The system of claim 23, wherein the message comprises a ComponentBroker message queue message.

25. A program product, comprising:

a computer-usable medium; and program code encoded within said computer-usable medium, said program code including a first message object compliant with a first message protocol and a second message object compliant with a second message protocol, wherein the first messaging object is an Enterprise Java Bean wherein said first message object, responsive to a call by a first program object, calls a function to determine properties of the second message object and stores within the first message object at least a part of the properties of the second message object, and wherein said first message object, responsive to thereafter receiving a message from the first programming object, calls the second message object to pass the message to the second message object, and wherein the second message object, responsive to receipt of the message, passes the message to the second programming object, such that the message communicated between programming objects employing diverse message protocols.

26. The computer program product of claim 25, wherein the first messaging protocol is compliant with the Java programming language.

27. The computer program product of claim 25, wherein the second messaging object is an message queue business object.

28. The computer program product of claim 25, wherein the first message object receives said message via a put call.

29. The computer program product of claim 28, wherein the message comprises a ComponentBroker message queue message.

30. The program product of claim 25, and further comprising:

a container that contains and manages said first message object.

31. The program product of claim 30, wherein said container manages persistence of said first message object to be coextensive with a communication session with said first programming object.

32. The program product of claim 25, and further comprising a factory that instantiates said first message object in response to a factory call by said first programming object.

33. The program product of claim 25, wherein said second message object is a factory that instantiates said second programming object in response to receipt by said factory of said message.

34. The program product of claim 33, wherein said message is a first message, and said factory instantiates another second programming object in response to receipt of a second message from said first programming object.

35. A program product, comprising:
   a computer-usable medium; and
   program code encoded within said computer-usable medium, said program code including a first message object compliant with a first message protocol and a second message object compliant with a second message protocol, wherein the second messaging protocol is compliant with the ComponentBroker MessageQueue, wherein said first message object, responsive to a call by a first program object, calls a function to determine properties of the second message object and stores within the first message object at least a part of the properties of the second message object, and wherein said first message object, responsive to thereafter receiving a message from the first programming object, calls the second message object to pass the message to the second message object, and wherein the second message object, responsive to receipt of the message, passes the message to the second programming object, such that the message communicated between programming objects employing diverse message protocols.

36. The computer program product of claim 35, wherein the first messaging object is an Enterprise Java Bean.

\* \* \* \* \*